Patented Dec. 26, 1939

2,184,748

UNITED STATES PATENT OFFICE 2,184,748

VITAMIN PREPARATION AND METHOD FOR PREPARING SAME

Robert F. Light, Mount Vernon, and Charles N. Frey, Scarsdale, N. Y., assignors to Standard Brands Incorporated, New York, N. Y., a corporation of Delaware No Drawing. Application November 5, 1938, Serial No. 239,020

6 Claims. (Cl. 167—81)

The invention relates to a method for the separation of vitamins from a material containing the same. More particularly, it relates to the separation of the vitamins B and G from yeast, and includes correlated improvements and discoveries whereby such separation may be effected.

It has been recognized that certain foods, for example, milk, are deficient in vitamin B, particularly in so far as the requirements of infants are concerned, and that other foods are deficient in vitamin G. Thus, most cereals are deficient in this vitamin although they are fairly rich in vitamin B.

In order to compensate for deficiencies in vitamins B and G in various foods, it is desirable that a composition containing a relatively large amount of these vitamins be available for addition to food products in order to give them a suitable and desired vitamin content.

It is an object of this invention to provide a method for the preparation of a concentrated vitamin B and G material, and a composition which may be readily added to food products.

Another object of the invention is to provide a method whereby vitamins B and G may be readily, economically and efficiently obtained on a commercial scale.

An additional object of the invention is the provision of a method whereby a concentrated preparation containing vitamins B and G may be produced from yeast.

A further object of the invention is to provide a method whereby vitamins B and G may be separated from yeast under conditions giving an effective removal of the vitamins without rendering the yeast unsuitable for further utilization.

Still another object of the invention is to provide, as an article of manufacture, a composition of matter rich in vitamins B and G, and which may be used in the preparation of food and medicinal products.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the invention will be indicated in the claims.

In the practice of the invention, vitamins B and G may be obtained from yeast in concentrated form by subjecting the yeast to plasmolysis in the presence of an agent increasing the plasmolytic action, that is, decreasing the time required for plasmolysis, then adjusting the pH value and coagulating the protein material whereby filterability of the plasmolyzed mass is increased, thereby materially decreasing the time required in separating the liquid portions from the residual solids, filtering, and concentrating the filtrate so obtained. The plasmolysis of the yeast may be brought about by admixing therewith a material which leads to a liquefying of the yeast in a short time, such as half an hour. This material may be an ester of a fatty acid, more particularly of acetic acid and especially ethyl acetate. However, other materials may be used, and a group which has been found to give satisfactory results consists of ether, chloroform, diethylene dioxide and acetone, in addition to ethyl acetate. The quantity of these materials may vary considerably, and it has been found that from 1 to 3% will be sufficient to give the desired liquefying action. It will, of course, be understood that a lower rather than a higher percentage is desired for commercial reasons, and effective commercial results have been obtained when using 1% of the above mentioned substances.

In order to increase the filterability of the plasmolyzed mass, a coagulation of the protein material is occasioned by adjusting the pH value thereof and adding thereto an alcohol, as methyl alcohol, ethyl alcohol, and also ethyl acetate may be used. When using ethyl acetate as the plasmolytic agent, and also as the coagulant for protein material, it is desirable that the two procedures be carried out as separate steps, that is, the liquefying action taking place first in the presence of 1 to 3% ethyl acetate, and then coagulation effected by adding more ethyl acetate up to about 40%. Coagulation of protein material is accomplished by adjusting the pH value of the plasmolyzed mass, adding the coagulant and allowing the mass to stand for a period of time, about 24 hours. The mass is now filtered, as by means of a filter press, and the filtrate subsequently concentrated at a temperature not exceeding 75–80° C. to about 80% solids by heating under a vacuum. Following concentration the pH value, or acidity of the vitamin containing composition is suitably adjusted to give a highly active and stable product.

The pH value of the plasmolyzed mass is adjusted to from 5.0 to 6.5, and preferably to 5.5. This value is established by adding an acid, as hydrochloric, sulfuric, acetic and lactic, or an alkali as the hydroxides of sodium and potassium, and the carbonates of sodium, potassium and calcium as the particular conditions may require. Adjustment of the pH value of the plasmolyzed mass is effected in order to avoid adsorption and absorption of the vitamins by coagulated protein substance, and to obviate destruction of the vitamins. Further, the enzymes and the vitamins are not affected in a like manner by like acid or pH conditions. Thus, the enzyme acts at a pH value which destroys the vitamin and hence a pH adjustment is required so that such a destruction is not entailed. Moreover, a definite pH value or adjustment is to be made whereby filtration can readily be accomplished.

Yeast, following plasmolysis, is difficult to filter and it will not be practical to operate without as easy filtration, hence it is necessary to adjust the pH value of the plasmolyzed mass to which a protein coagulent is added, as an alcohol, in order that filtration will take place. Additionally, the pH values of the mass are not such as merely occur at a certain stage of the process. Rather, such adjustment functions to prevent destruction of the vitamins; to obviate adsorption and absorption of vitamins by coagulated protein substance, and to bring about coagulation of protein substance in conjunction with, e. g., an alcohol in a condition such that the protein substance may be readily removed by filtration.

When using an alcohol as a coagulating agent, the concentration thereof may be from 50–60% of the mass, but preferably it does not exceed 55%, inasmuch as at concentrations higher than 60% there is a precipitation of the vitamins. The primary object is not precipitation of protein, but an extraction of the vitamins and the conditions provided are those that conserve the vitamins with an attending throwing out of protein. The temperature to which the mass is heated does not suitably exceed 75–80° C. other than during the coagulation of the protein when desirably the temperature may be raised to 95–100° C. for a short period and then immediately lowered. It is desirable that the alcohol concentration does not exceed 55% in order to avoid loss of vitamin, especially G.

As an illustrative example of a manner in which the method may be practiced, the following example is given. The parts are by weight.

1 part of yeast is admixed with 0.01 part of ethyl acetate and the mixture allowed to liquefy or undergo plasmolysis for from 15 to 20 minutes. The pH value of the plasmolyzed mass so obtained may now be adjusted to about 5.5, as for example by the addition of a suitable alkali as sodium hydroxide, and there are then added 0.6 part of water, and 1.2 parts alcohol, giving an alcohol concentration of between 50–60%, in order to bring about coagulation of protein material. When admixture of alcohol and the plasmolyzed mass has been brought about, it is allowed to stand for about 24 hours, at the end of which time filtration may be readily carried out, as by means of a filter press. Plasmolysis and coagulation desirably are carried out at a temperature not exceeding 75–80° C., but during coagulation the temperature may be raised to 95–100° C. for a short period, followed by an immediate lowering.

The coagulation of the protein material has been such as to permit the filtering operation to proceed very rapidly, and there is obtained a clear amber filtrate and a solid press cake. The filtrate which contains the vitamins B and G is then concentrated under vacuum at a temperature not exceeding 75–80° C. to about 80% solid content.

For retention of activity and potency the pH value of the concentrate should be determined and adjusted to a value of from about 5.0 to 6.0, preferably to 5.5, by the addition of an acid, as hydrochloric, phosphoric, sulfuric, acetic, lactic and the like, when the pH is too high; or of an alkaline reacting compound, as the hydroxides, carbonates and bicarbonates of sodium, potassium and ammonium, or of a salt which buffers the acidity, e. g., sodium acetate. This adjustment of acidity is occasioned since the presence of a volatile acid in the filtrate will lead to an increase in pH during concentration, whereas a non-volatile acid content will effect a decrease in pH value.

The concentrate in accordance with the foregoing has an agreeable meaty odor, and was found to contain approximately 125 vitamin B units per gram, i. e., International $B_1$ units. The vitamin G potency of the product is somewhat lower than that of the vitamin B, but it was found to contain about 25 vitamin G units per gram. It will be noted therefrom that there is thus obtained a preparation which is fairly rich in vitamins B and G; is also greatly concentrated as compared with the original yeast, and that odor and taste of the concentrate are very satisfactory.

The vitamin B and G concentrate prepared in the above manner is suitable for a variety of purposes, such as in the manufacture of food products, tonics, and nutritious drinks whereby the admixture with these products improves the nutritive qualities thereof. The concentrates may be used wherever it is desired to overcome vitamin B and/or G deficiency in a food or medicinal product. The concentrate is particularly suitable for use in the preparation of infant foods inasmuch as nearly all such foods are deficient in vitamin B, and it is not only desirable but necessary to add vitamin B in concentrated form to these foods in order to make up for their deficiency therein and without unbalancing the proper ratios of protein, ash, lactose and fat.

One manner in which the vitamin concentrate may be utilized is in admixture, by incorporation with a farinaceously derived material, such as a starch conversion product containing dextrin. More particularly, such a composition may be prepared by incorporating or combining 5% of the vitamin B and G concentrate with a starch conversion product containing about 50% maltose and 50% dextrin. The appearance of the starch conversion product is not changed by this addition, nor is the solubility altered. The potency, however, of the material so prepared with respect to B and G is about that of a good dried yeast. Furthermore, the vitamin B and G concentrate may be added to a dried malt, or it may be added to a wheat germ extract yielding in both cases a desirable product. Also, the addition of the concentrate may be in an amount such as to give a sought for increase in potency. For example, with wheat germ extract it may be added in order to give a composition having about two times the potency of dried yeast without any material change in the extract.

A further advantageous feature of the process hereinbefore described is that the addition of a protein material coagulant permits a ready separation of liquid from solid materials and the solid residue is suitable and may be utilized for other purposes, such as for the preparation of ergosterol. It is believed that it will be clear that the foregoing procedure in which a preliminary plasmolysis of yeast is effected by a reagent such as ethyl acetate, with the subsequent use of an alcoholic solution to facilitate filtration without interfering with the extraction of the vitamin, may be readily practiced on a commercial scale to yield a preparation containing vitamins B and G in considerable amounts. Further, it is to be noted that the process of the invention utilizes a volatile solvent material which is readily removed by evaporation.

This application is a continuation in part of our co-pending applications Serial No. 644,488, filed November 26, 1932, and Serial No. 141,859, filed May 10, 1937.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A process for the preparation of a vitamin B and G concentrate from yeast, which comprises plasmolyzing yeast, adjusting the pH of the mass to a value of 5.0 to 6.5, coagulating protein material by adding a coagulant belonging to the group consisting of methyl alcohol, ethyl alcohol, and ethyl acetate to a concentration of 50 to 60% of the mass whereby filter-ability thereof is increased, filtering and concentrating the filtrate so obtained at a temperature not exceeding 75–80° C.

2. A process for the preparation of a vitamin B and G concentrate from yeast, which comprises plasmolyzing yeast by means of an ester of a fatty acid, adjusting the pH of the mass to a value of 5.0 to 6.5, coagulating protein material by adding an alcohol to the plasmolyzed mass to a concentration of 50 to 60% of the mass whereby filterability is increased, filtering, and concentrating the filtrate so obtained at a temperature not exceeding 75–80° C.

3. A process for the preparation of a vitamin B and G concentrate from yeast, which comprises plasmolyzing yeast by means of ethyl acetate, adjusting the pH of the mass to a value of 5.0 to 6.5, coagulating protein material by adding ethyl alcohol to the plasmolyzed mass to a concentration of 50 to 60% of the mass whereby filterability is increased, allowing to stand, filtering, and concentrating the filtrate so obtained to about 80% solids at a temperature not exceeding 75–80° C.

4. A process for the preparation of a vitamin B and G concentrate from yeast, which comprises plasmolyzing yeast by means of a compound belonging to the group consisting of ethyl acetate, ether, chloroform, diethylene dioxide and acetone, adjusting the pH of the mass to a value of 5.0 to 6.5, coagulating protein material by adding a compound belonging to the group consisting of ethyl alcohol, methyl alcohol, ethyl acetate to the plasmolyzed mass to a concentration of about 55% of the mass whereby filterability is increased, allowing the admixture to stand, filtering, and concentrating the filtrate so obtained to about 80% solids at a temperature not exceeding 75–80° C.

5. A process for the preparation of a vitamin B and G concentrate from yeast, which comprises plasmolyzing yeast with the addition thereto of from 1 to 3% ethyl acetate, adjusting the pH of the mass to a value of about 5.5, coagulating protein material by adding ethyl alcohol to about 55% alcohol content of the plasmolyzed mass whereby filterability is increased, allowing the admixture to stand for a period of about 24 hours, filtering, and concentrating the filtrate so obtained to about 80% solid content by heating under a vacuum at a temperature not exceeding 75–80° C.

6. A process for the preparation of a vitamin B and G concentrate from yeast, which comprises plasmolyzing yeast by mixing therewith a volatile material in which vitamins B and G are soluble, adjusting the pH of the mass to a value of 5.0 to 6.5, adding to the plasmolyzed mass a protein coagulant belonging to the group consisting of methyl alcohol, ethyl alcohol, and ethyl acetate to a concentration of 50 to 60% of the mass whereby protein material is coagulated and filterability of the plasmolyzed mass increased, filtering and removing solvent and protein coagulant from the filtrate by evaporation at a temperature not exceeding 75–80° C.

ROBERT F. LIGHT.
CHARLES N. FREY.